(12) United States Patent
Watanabe et al.

(10) Patent No.: US 8,590,565 B2
(45) Date of Patent: Nov. 26, 2013

(54) FUEL TANK

(75) Inventors: Hiroaki Watanabe, Saitama (JP);
Shinya Murabayashi, Saitama (JP);
Kiyofumi Shida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1069 days.

(21) Appl. No.: 12/313,099

(22) Filed: Nov. 17, 2008

(65) Prior Publication Data

US 2009/0133762 A1   May 28, 2009

(30) Foreign Application Priority Data

Nov. 27, 2007  (JP) .................................. 2007-306262
Jun. 19, 2008  (JP) .................................. 2008-160698

(51) Int. Cl.
*E03C 1/18* (2006.01)

(52) U.S. Cl.
USPC ...... 137/582; 137/574; 137/565.34; 123/514; 220/734

(58) Field of Classification Search
USPC ............. 137/582, 565.34, 574; 123/495–515; 220/734; 280/834; 428/35.7
See application file for complete search history.

(56) References Cited

U.S. PATENT DOCUMENTS

| | | | | |
|---|---|---|---|---|
| 3,400,854 A | * | 9/1968 | Conaway et al. | 220/734 |
| 3,784,050 A | * | 1/1974 | Pollack | 220/734 |
| 4,453,564 A | * | 6/1984 | Bergesio | 137/574 |
| 4,974,743 A | * | 12/1990 | Sasaki et al. | 220/694 |
| 5,031,795 A | * | 7/1991 | Kotera et al. | 220/563 |
| 5,312,012 A | * | 5/1994 | Zink | 220/563 |
| 5,890,618 A | * | 4/1999 | Spickelmire | 220/563 |
| 5,891,385 A | * | 4/1999 | Cerbelle et al. | 264/515 |
| 6,032,347 A | * | 3/2000 | Behr et al. | 29/419.1 |
| 6,276,342 B1 | * | 8/2001 | Sinz et al. | 123/514 |
| 6,314,995 B1 | * | 11/2001 | Meyer | 137/565.22 |
| 6,431,388 B1 | * | 8/2002 | Spickelmire et al. | 220/563 |
| 6,661,339 B2 | * | 12/2003 | Muirhead | 340/505 |
| 6,712,234 B2 | * | 3/2004 | Boecker | 220/563 |
| 6,810,908 B2 | * | 11/2004 | Eck et al. | 137/565.22 |
| 6,966,401 B2 | * | 11/2005 | Kojima | 181/233 |
| 7,051,716 B2 | * | 5/2006 | Maasz | 123/509 |
| 7,069,913 B1 | * | 7/2006 | Crary | 123/509 |
| 7,445,082 B2 | * | 11/2008 | Nakanii et al. | 181/198 |
| 2001/0013516 A1 | * | 8/2001 | Boecker | 220/562 |
| 2002/0011271 A1 | * | 1/2002 | Taurel et al. | 137/565.24 |
| 2004/0096611 A1 | * | 5/2004 | Lucke et al. | 428/35.7 |
| 2005/0211310 A1 | | 9/2005 | Aschoff et al. | |
| 2006/0220370 A1 | * | 10/2006 | Grant | 280/834 |

(Continued)

FOREIGN PATENT DOCUMENTS

| | | |
|---|---|---|
| DE | 1 455 496 A1 | 5/1969 |
| DE | 39 05 611 A1 | 9/1989 |
| DE | 195 30 256 C1 | 1/1997 |
| EP | 0 413 609 A1 | 2/1991 |
| EP | 0 758 579 A1 | 2/1997 |
| JP | 57-32909 | 2/1982 |

(Continued)

*Primary Examiner* — John Rivell
*Assistant Examiner* — Minh Le
(74) *Attorney, Agent, or Firm* — Carrier Blackman & Associates, P.C.; William D. Blackman; Joseph P. Carrier

(57) ABSTRACT

An improved fuel tank is disclosed. In the fuel tank, a shock-absorbing member comprising a plurality of foam members is mounted to an in-tank functional component provided inside a resin fuel tank body. When the fuel inside the tank sloshes up and down, the fuel strikes the shock-absorbing member, causing the force of the waves to be dispersed, and reducing the fuel sloshing sound created by the sloshing of the fuel.

8 Claims, 6 Drawing Sheets

(56) References Cited

U.S. PATENT DOCUMENTS

| | | | |
|---|---|---|---|
| 2006/0237466 A1* | 10/2006 | Nakanii et al. | 220/734 |
| 2007/0089798 A1* | 4/2007 | Matsuo et al. | 138/118 |
| 2007/0267071 A1* | 11/2007 | Milton | 137/565.24 |
| 2008/0110517 A1* | 5/2008 | Bae | 138/39 |
| 2009/0078705 A1* | 3/2009 | Ramsay | 220/562 |
| 2010/0116828 A1* | 5/2010 | Takahashi et al. | 220/562 |
| 2011/0186582 A1* | 8/2011 | Whitaker et al. | 220/563 |

FOREIGN PATENT DOCUMENTS

| | | |
|---|---|---|
| JP | S63-67328 | 5/1988 |
| JP | 03-213430 | 9/1991 |
| JP | 05-139169 | 6/1993 |
| JP | 09-202149 | 8/1997 |
| JP | 2003-159950 | 6/2003 |
| JP | 3893337 | 12/2006 |
| JP | 2007-023843 | 2/2007 |

* cited by examiner

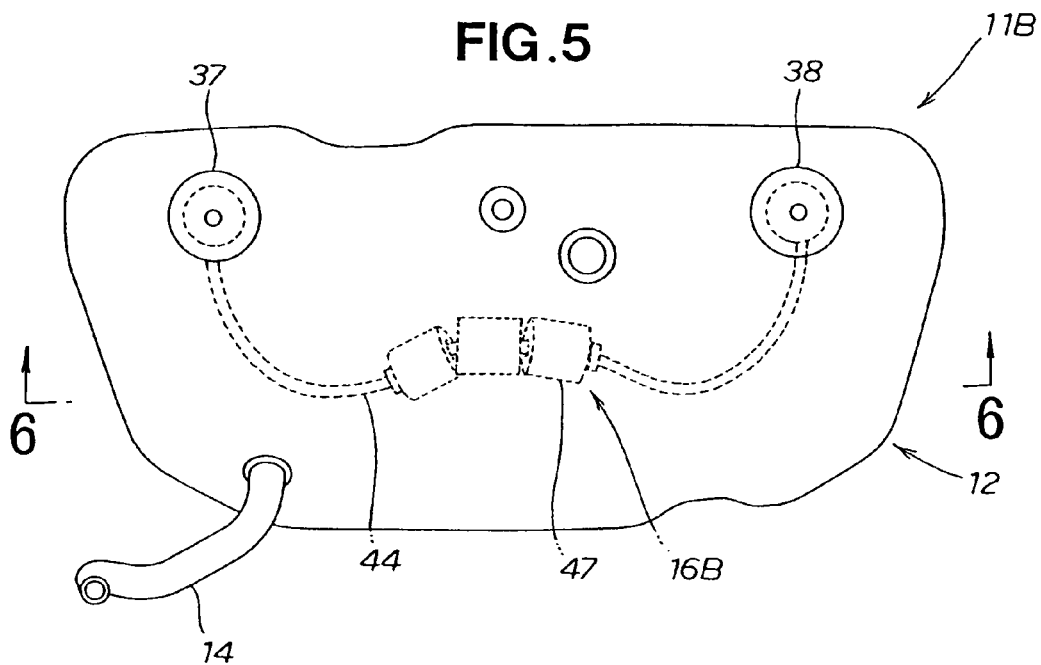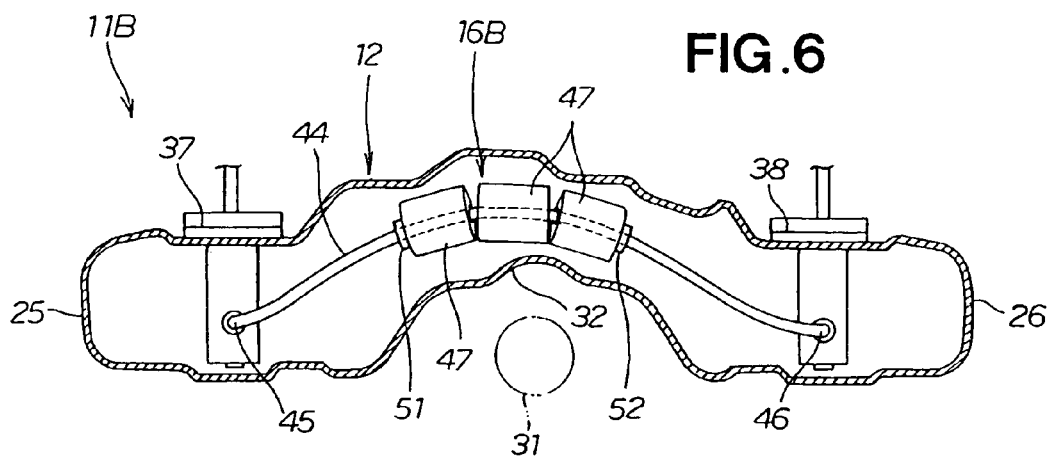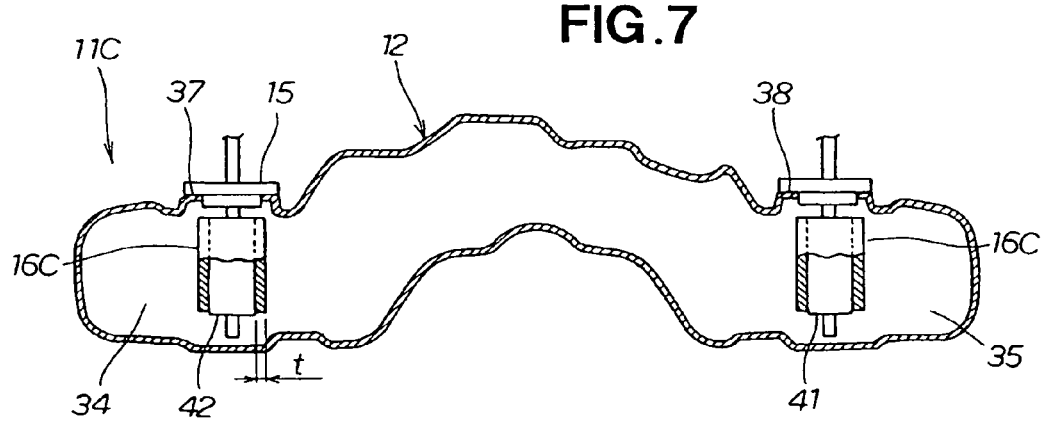

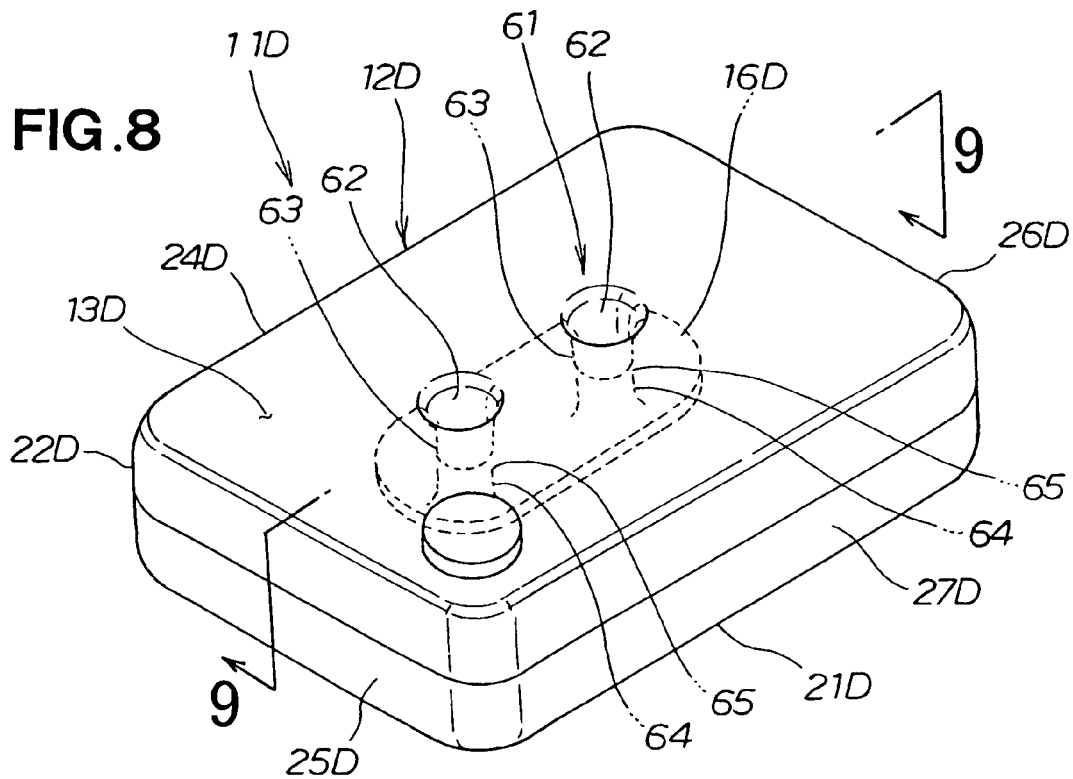
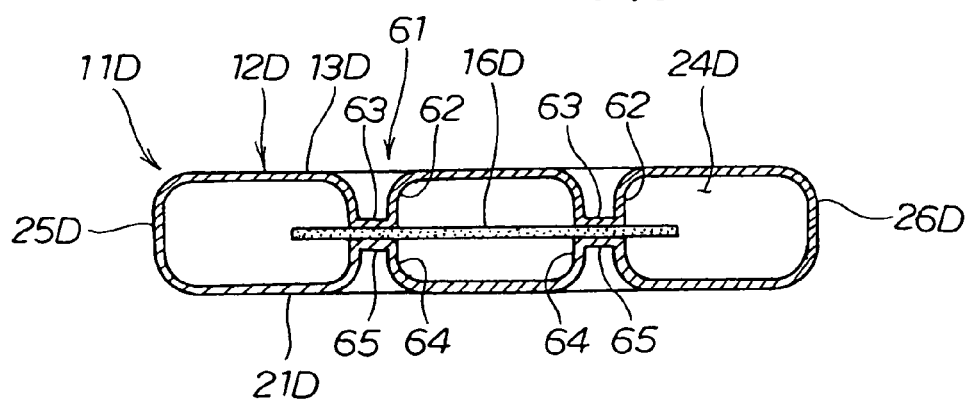

FUEL TANK

FIELD OF THE INVENTION

The present invention relates to an improvement in a fuel tank.

BACKGROUND OF THE INVENTION

A fuel tank having an internally mounted wave-damping member made of a fibrous resin material is known, as disclosed in Japanese Patent Application Laid-Open Publication No. HEI-05-139169 (JP 05-139169 A).

With the aforementioned wave-damping member, however, the tank body is bisected into an upper and a lower portion, and the member cannot be used in a single-piece fuel tank. Specifically, a wave-damping member made of a resin material is sandwiched and held in place between the edge of an upper shell above and the edge of a lower shell below in the fuel tank, but the problem is that because a resin tank is usually manufactured by hollow molding (blow molding), the wave-damping member cannot be installed inside the resin-tank body.

Using a wave-damping member in a resin-tank body brings about a problem in that limitations in terms of the shape of the wave-damping member, the size of the wave-damping member, the mounting location, and the like become more stringent with the insertion of the wave-damping member into the tank body. Another problem is that the structure for fixing the wave-damping member in the fuel tank becomes more complicated.

Also known is a fuel tank in which a blowhole is used during molding of the resin-tank body and in which a tilting shutoff valve or other functional component is mounted in the opening, as disclosed in Japanese Patent No. 3,893,337.

The fuel tank disclosed in Japanese Patent No. 3,893,337 presents a problem in that since a functional component is welded in a hole formed in the tank wall, the barrier layer in that area is adversely affected, and there is a danger that penetration through the weld may occur. Another problem is that the structure for mounting the functional component is complicated.

A resin fuel tank in which a wave-damping plate extends halfway into the tank from the upper wall of the tank, and the remainder of the wave-damping plate extends into the tank from the bottom wall of the tank in order for the wave-damping plate to be placed in the tank in an upright manner is also known, as disclosed in Japanese Utility Model Application Laid-Open Publication No. SHO-57-032909 (JP-U 57-032909 A).

The fuel tank disclosed in JP-U 57-032909 A presents a problem in that because the wave-damping plate extends into the tank, there is a danger that the capacity of the tank will decrease. Another problem is that the degree of freedom in selecting the shape of the wave-damping plate is low, as is the degree of freedom in selecting the mounting location, making it difficult to obtain a significant effect.

SUMMARY OF THE INVENTION

An object of the present invention is to provide a fuel tank in which a reduction in the fuel sloshing sound is not impaired, a shock-absorbing member can be shaped with a high degree of freedom, no welding is needed when the shock-absorbing member is mounted, installation only on the source of the sloshing sound is sufficient, the volume of the shock-absorbing member can be kept small, the fuel sloshing sound is minimized, and the reduction in the tank capacity can be minimized.

According to one aspect of the present invention, there is provided a fuel tank which comprises a resin tank body; an in-tank functional component provided inside the tank body; and a shock absorbing member formed into a shape mountable to the in-tank functional component.

When the fuel tank is tilted, the fuel in the tank body sloshes up and down, strikes the shock-absorbing member, and causes the force of the waves to be dispersed, allowing the fuel sloshing sound created by the sloshing of the fuel to be reduced.

Furthermore, since the shock-absorbing member is made of a foamable material and is formed into a shape mountable to the in-tank functional component, the member can expand and contract and can be shaped with a high degree of freedom.

Also, the in-tank functional component is mounted to the tank body using a catch or a screw. Therefore, no welding is needed during the mounting of the shock-absorbing member, and there's no concern that the parts will be perforated or melted through.

A shock-absorbing member formed into a shape mountable to the in-tank functional component is provided. Therefore, installation only on the source of the fuel sloshing sound is sufficient, and the fuel sloshing sound can be minimized.

Fuel penetrates into the pores of the foamable material, and it is sufficient for the shock-absorbing member to be installed only on the source of the fuel sloshing sound. Therefore, the volume of the shock-absorbing member can be kept small, and reduction in the tank capacity can be minimized.

The in-tank functional component is preferably a resin pipe member having both ends thereof fixed inside the tank body. The result is that the shock-absorbing member can expand and contract and can be shaped with a high degree of freedom. Furthermore, since the resin pipe member has both ends thereof fixed inside the tank body, it is not necessary to use welding when mounting the shock-absorbing member after resin molding, and there is no concern of penetration by welding.

The in-tank functional component is preferably a supply pump for pumping fuel from inside the tank body. Accordingly, since the supply pump is mounted to the tank body using a screw, it is not necessary to use welding when mounting the shock-absorbing member after resin molding, and there is no concern of penetration by welding. Furthermore, since the shock-absorbing member is provided to the supply pump, installation only on the source of the fuel sloshing sound is sufficient, and the fuel sloshing sound can be minimized.

The shock-absorbing member is preferably fixed by a fixing wire and is incorporated into the tank body from an opening formed in the tank body in order to mount the in-tank functional component. Accordingly, it is not necessary to provide a fixing part for fixing the shock-absorbing member inside the tank body. Furthermore, the installation position of the shock-absorbing member can be established by adjusting the shock-absorbing member and the fixing wire. For example, the installation position can be established on a lateral plate of the tank body, and the shock-absorbing member can be installed solely on the source of the sloshing noise more securely.

The fixing wire is preferably ring-shaped.

The fuel tank according to another aspect of the present invention comprises a resin tank body and a shock-absorbing member, wherein the shock-absorbing member is provided to a vertical weld for connecting a bottom plate of the tank body and a top plate that faces the bottom plate.

Since the fuel strikes the shock-absorbing member and the force of the waves is dispersed, the fuel sloshing sound created by the sloshing of the fuel can be reduced.

A shock-absorbing member is provided to the vertical weld for connecting the bottom plate and the top plate of the tank body. Therefore, the shock-absorbing member is welded to the vertical weld when the tank body is formed, making it unnecessary to use welding when mounting the shock-absorbing member to the tank body, and eliminating concern that penetration will be created by welding.

The vertical weld preferably comprises a first shock-absorbing part protruding in a substantially cylindrical shape into the tank body from the top plate, and a second shock-absorbing part protruding in a substantially cylindrical shape into the tank body from the bottom plate. Consequently, since the first shock-absorbing part and the second shock-absorbing part are struck and the force of the wave is dispersed, the fuel sloshing sound created by the sloshing of the fuel can be reduced.

BRIEF DESCRIPTION OF THE DRAWINGS

Certain preferred embodiments of the present invention will be described in detail below, by way of example only, with reference to the accompanying drawings, in which:

FIG. 5 is a top plan view of a fuel tank according to a second embodiment of the present invention;

FIG. 6 is a cross-sectional view taken along line 6-6 of FIG. 5;

FIG. 7 is a cross-sectional view of a fuel tank according to a third embodiment of the present invention;

FIG. 8 is a perspective view of a fuel tank according to a fourth embodiment of the present invention;

FIG. 9 is a cross-sectional view taken along line 9-9 of FIG. 8;

DETAILED DESCRIPTION OF THE PREFERRED EMBODIMENTS

Figure 1:
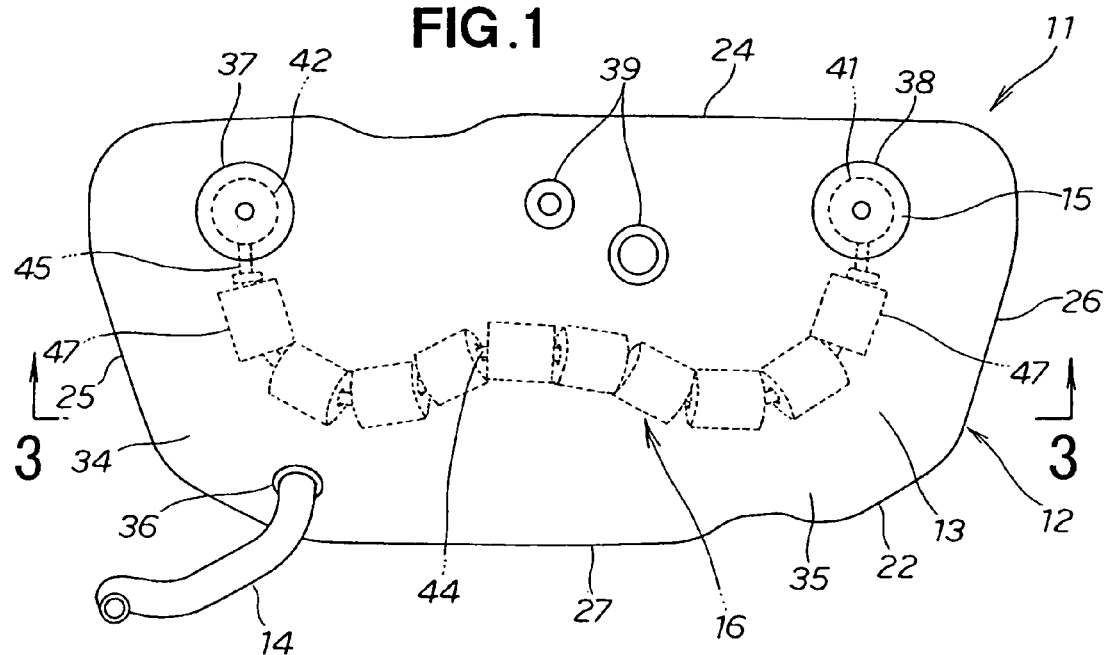
FIG. 1 is a top plan view of a fuel tank according to a first embodiment of the present invention.
Figure 2:
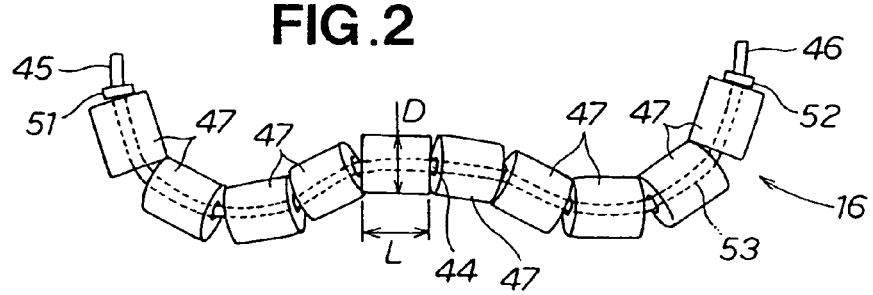
FIG. 2 is a view showing a shock-absorbing member of FIG. 1.
Figure 3:
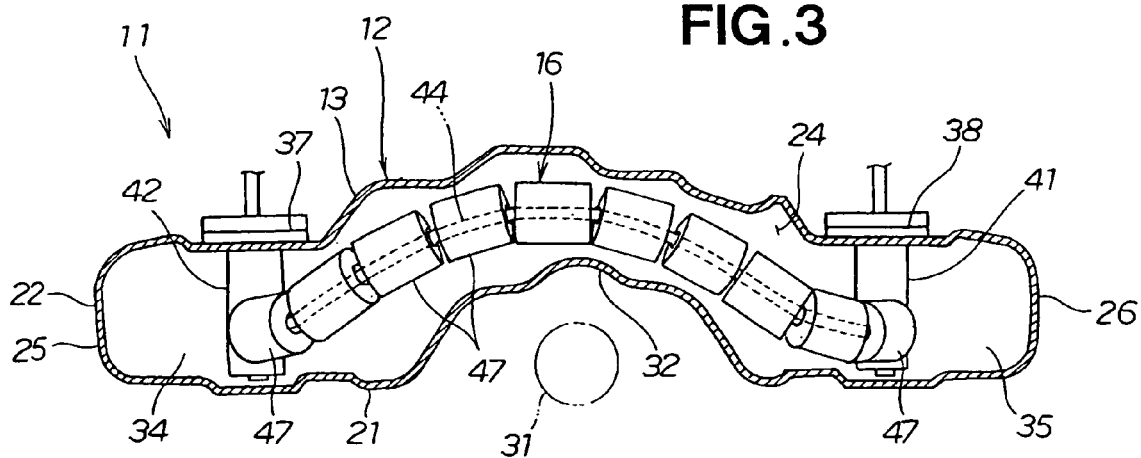
FIG. 3 is a cross-sectional view taken along line 3-3 of FIG. 1.

Referencing now FIGS. 1 to 3, a fuel tank 11 according to a first embodiment of the present invention has a resin tank body 12, a fuel supply pipe 14 connected to a top plate 13 of the tank body 12, an in-tank functional component 15 provided inside the resin tank body 12, and a shock-absorbing baffle member 16 having a foam member formed from a foamable fuel-tolerant material.

The resin tank body 12 comprises a bottom plate 21, a lateral plate 22 connected to the bottom plate 21, and a top plate 13 connected to the lateral plate 22 and disposed facing the bottom plate 21. The lateral plate 22 comprises a front-side part 24 disposed facing the front of a vehicle, a left-side part 25 and a right-side part 26 connected to the front-side part 24, and a rear-side part connected to the left-side part 25 and the right-side part 26.

Since the tank body 12 is made of multiple resin layers, and a barrier layer is interposed between the multiple layers, penetration of gaseous fuel is prevented by the barrier layer.

For the barrier layer, EVOH (Ethylene-Vinyl Alcohol Copolymer Resin) may, for example, be used, and the layer may be bonded using an adhesive layer.

Furthermore, to prevent interference with a propeller shaft 31, the tank body 12 has a saddle structure in which an arcuate connecting channel 32 is formed in the widthwise center of the vehicle. This structure has a principal chamber 34 positioned on the left, and a secondary chamber 35 positioned on the right The top plate 13 is provided, in a plural number, with a first opening 37, a second opening 38, and other openings 39 for mounting a supply pipe connection 36 for connecting the fuel supply pipe 14, external tank components (not shown), and the in-tank functional component 15.

The in-tank functional component 15 has a suction pump 41 for suctioning fuel from the secondary chamber 35 to the main chamber 34, a supply pump 42 for supplying fuel from the main chamber 34 to the engine, and a transfer tube 44, which is a resin pipe member for connecting the supply pump 42 to the suction pump 41.

The transfer tube 44 is placed in the tank body 12 through the first opening 37 or the second opening 38, a first end 45 thereof is attached to the supply pump 42, and a second end 46 thereof is attached to a discharge port of the suction pump 41. The shock-absorbing member 16 is mounted on the transfer tube 44.

The shock-absorbing member 16 comprises a plurality of foam members 47 connected together by the transfer tube 44. The foamable members are formed using foamed rubber, resin, or the like generally referred to as a sponge, and the shock-absorbing member is disposed substantially along the bottom plate 21 and the top plate 13. Ten foam members 47 are fitted over the transfer tube 44 and are fixed in place by a first retaining member 51 at the first end 45 and a second retaining member 52 at the second end 46.

Each of the foam members 47 is formed into a cylindrical shape and is provided with a hole 53 formed to allow the transfer tube 44 to pass through. The outside diameter D, the length L, and the ratio of the length and outside diameter (L/D) are each equal to about one. The outside diameter D should allow the tube to pass though the first opening 37 or the second opening 38.

Setting the ratio (L/D) of the length and outside diameter to about one for the foam members 47 makes it possible to position the shock-absorbing member 16 without collapsing the foam members 47 in a saddle structure having a complex shape, and to ultimately reduce the fuel-sloshing noise and to increase the degree of freedom for the shape of the shock-absorbing member 16.

Also, flexibility is improved when the foam members 47 are connected by the transfer tube 44, and assembly operations inside the tank body 12 are simplified.

An example outlining the assembly of the shock-absorbing member 16 on the tank body 12 will now be described briefly on the basis of FIGS. 4A and 4B.

Figure 4A:
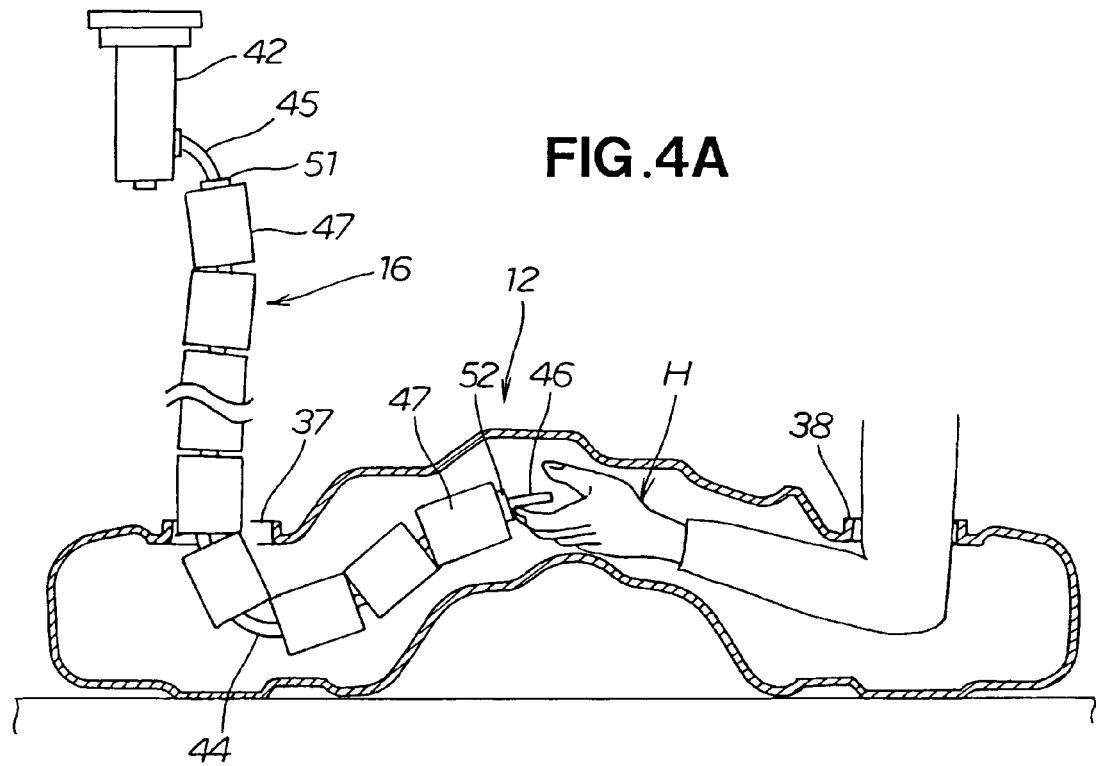
FIG. 4A and FIG. 4B are views showing the manner in which the shock-absorbing member of the first embodiment is assembled inside the tank body.

First, as shown in FIG. 4A, the first retaining member 51 is mounted to the first end 45 of the transfer tube 44 on the outside of the tank body 12, ten foam members 47 are passed over the tube from the second end 46, the second retaining member 52 is mounted to the second end 46, and the shock-absorbing member 16 is completed. The supply pump 42 is then attached to the first end 45.

Next, a hand H is inserted through the second opening 38, the second end 46 is inserted through the first opening 37 and grasped with the hand H, and the second end 46 is pulled and extracted together with the hand H from the second opening 38.

Figure 4B:
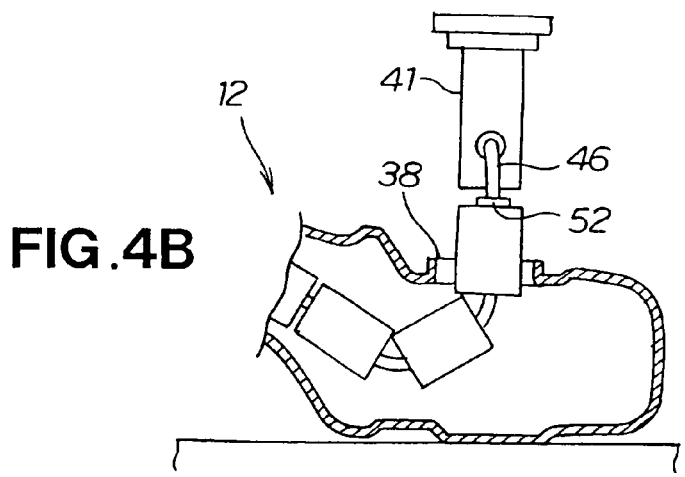

The second end 46 is subsequently attached to the suction pump 41, the second end 46 is returned to the inside of the tank from the second opening 38, and the suction pump 41 is mounted to the second opening 38, as shown in FIG. 4B. The supply pump 42 is mounted to the first opening 37. Assembly of the shock-absorbing member 16 is thereby completed.

In the example described above, ten foam members 47 are connected together, but the number of the foam members 47 can be arbitrarily set according to the width and other conditions of the tank body 12.

It is also acceptable to interpose a retaining member (not shown) identical to the first retaining member 51 between two adjacent foam members 47.

When the fuel inside the tank body 12 of the fuel tank 11 according to the first embodiment sloshes up and down, the fuel strikes against the shock-absorbing member 16 and causes the force of the waves to be dispersed, making it possible to reduce the fuel sloshing-sound created by the sloshing of the fuel.

The transfer tube 44 is made of a resin and is flexible, and the shock-absorbing member 16 connected by the transfer tube 44 is made of a foamable material and has a short length L. Therefore, the shock-absorbing member 16 can expand and contract, and the shock-absorbing member can be shaped with a high degree of freedom.

Since both ends of the transfer tube are fixed in place inside the tank body 12, fixing the shock-absorbing member 16 by welding is not necessary, and there is no concern of penetration by welding. There is concern that the barrier performance of the barrier layer will be affected by the heat of welding from the molded exterior of the tank body 12, but since welding is not used, the thickness of the molded barrier layer and the adhesive power of the barrier layer can be maintained, and penetration can be prevented.

Since the shock-absorbing member 16 is mounted by being connected to the transfer tube 44, welding is not necessary, and the welding step can be dispensed with.

Since the shock-absorbing member 16 is formed using a foamable material formed into a shape capable of being mounted to the in-tank functional component 15, the member can be installed only on the source of the fuel sloshing sound (for example, the front-side member 24 or the center of the tank interior), and the fuel sloshing sound can be minimized.

Since fuel can penetrate into the pores of the foamable material, and installation only on the source of the fuel sloshing sound is sufficient, the volume of the shock-absorbing member 16 can be kept small, and the reduction in the tank capacity can be minimized.

FIGS. 5 and 6 show a fuel tank 11B according to a second embodiment of the present invention. Identical symbols are used for structures similar to those of the fuel tank 11 according to the first embodiment, and a description thereof is omitted.

The fuel tank 11B according to the second embodiment has fewer shock-absorbing members 16B than in the first embodiment, and is configured so that installing the shock-absorbing members 16B only in the arcuate connecting channel 32 formed in the center of the tank body 12 is sufficient. In the illustrated example, three foam members 47 are passed over the transfer tube 44 and positioned in the connecting channel 32.

The fuel tank 11B according to the second embodiment has the same operation and effect as the fuel tank structure 11 according to the first embodiment.

FIG. 7 shows a fuel tank 11C according to a third embodiment of the present invention.

The fuel tank 11C according to the third embodiment comprises shock-absorbing members 16C mounted to the external periphery of the suction pump 41 and the supply pump 42 of the in-tank functional components 15.

The supply pump 42 is sufficiently small to be introduced into the interior from the first opening 37 and is mounted to the first opening 37.

The suction pump 41 is sufficiently small to be introduced into the interior from the second opening 38, and is mounted to the second opening 38.

The shock-absorbing member 16C covers the external periphery of the supply pump 42 and the suction pump 41 with a foamable material of thickness t. The member is mounted to two pumps, but one pump is also acceptable.

The fuel tank 11C according to the third embodiment has the same operation and effect as the fuel tank 11 according to the first embodiment.

FIGS. 8 and 9 show a fuel tank 11D according to a fourth embodiment of the present invention.

The fuel tank 11D according to the fourth embodiment comprises a shock-absorbing member or baffle plate 16D made of a foamable material, the shock-absorbing member 16D being provided in a central portion of the tank 11D, affixed to the tank as a central "sandwiched" part of a vertical weld 61 of a resin tank body 12D, as shown. The term "vertically extending pinch connection" may alternately be used to describe the vertical weld 61 shown in FIGS. 8-9.

The resin tank body 12D comprises a bottom plate 21D disposed facing downwards, a lateral plate 22D connected to the bottom plate 21D, and a top plate 13D connected to the lateral plate 22D and disposed facing the bottom plate 21D. The lateral plate 22D comprises a front-side part 24D disposed facing the front of the vehicle, a left-side part 25D and a right-side part 26D connected to the front-side part 24D, and a rear-side part 27D connected to the left-side part 25D and the right-side part 26D.

With the vertical weld 61, distal ends 65 of two second shock-absorbing parts 64 formed in the center of the lower plate 21D are joined to distal ends 63 of two first shock-absorbing parts 62 formed in the center of the top plate 13D.

Each of the first shock-absorbing parts 62 is an area protruding in a substantially cylindrical shape into the resin tank body 12D from the top plate 13D.

Each of the second shock-absorbing parts 64 is an area protruding in a substantially cylindrical shape into the resin tank body 12D from the bottom plate 21D.

Although the vertical weld 61 is formed into a substantially cylindrical shape, a shape other than a substantially cylindrical shape is also acceptable. Two first shock-absorbing parts 62 may also be connected together.

The shock-absorbing member 16D is a flat plate disposed substantially parallel to the top plate 13D in the center inside the resin tank body 12D. The member is then sandwiched and welded between the distal ends 63 of the first shock-absorbing parts 62 and the distal ends 65 of the second shock-absorbing parts 64.

The shock-absorbing member 16D was described with reference to an example in which the member was sandwiched between the distal ends 63 and 65, but this option is not limiting, and the member can be fixed in place by forming a through hole in the shock-absorbing member 16D, inserting the distal ends 63 of the first shock-absorbing parts 62 and the distal ends 65 of the second shock-absorbing parts 64 into the through hole, and welding the distal ends 65 to the distal end 63.

An example outlining formation of the fuel tank 11D according to the fourth embodiment is briefly described below.

A metal die is first opened, and the shock-absorbing member 16D is placed upright in a predetermined location in the opened center by using a retaining jig that doubles as a blow-pipe. The shock-absorbing member 16D is subsequently covered by a parison while the parison is formed using an existing procedure. Closing of the mold is started, the parison is inserted using the metal die, two first shock-absorbing parts 62 are formed by the die, two second shock-absorbing parts 64 are formed, and the shock-absorbing member 16D is inserted and welded. Air is blown from the blow-pipe to keep the components adhered to the die. Subsequent operations are the same as in the existing procedure.

When the fuel inside the tank body 12D of the fuel tank 11D according to the fourth embodiment sloshes up and down, the fuel strikes the shock-absorbing member 16D and causes the force of the waves to be dispersed, making it possible to reduce the fuel sloshing-sound created by the sloshing of the fuel.

In the fuel tank 11D, it is not necessary to fix the shock-absorbing member 16D in place by welding after molding, and there is no concern of penetration by welding.

Since the shock-absorbing member 16D is mounted using the vertical weld 61, welding after molding is not necessary, and the welding step can be dispensed with.

In the fuel tank 11D according to the fourth embodiment, the shock-absorbing member 16 D is a flat plate disposed substantially parallel to the top plate 13D in the center inside the tank body 12D. Therefore, when the fuel sloshes up and down, the member resists the rising and falling of the wave of fuel, and the fuel sloshing sound caused by the up and down sloshing can be reduced.

When the fuel inside the tank body 12 of the fuel tank 11D according to the fourth embodiment sloshes up and down, the fuel strikes the first shock-absorbing parts 62 and the second shock-absorbing parts 64 and causes the force of the waves to be dispersed, making it possible to reduce the fuel sloshing sound created by the sloshing of the fuel.

Figure 10:
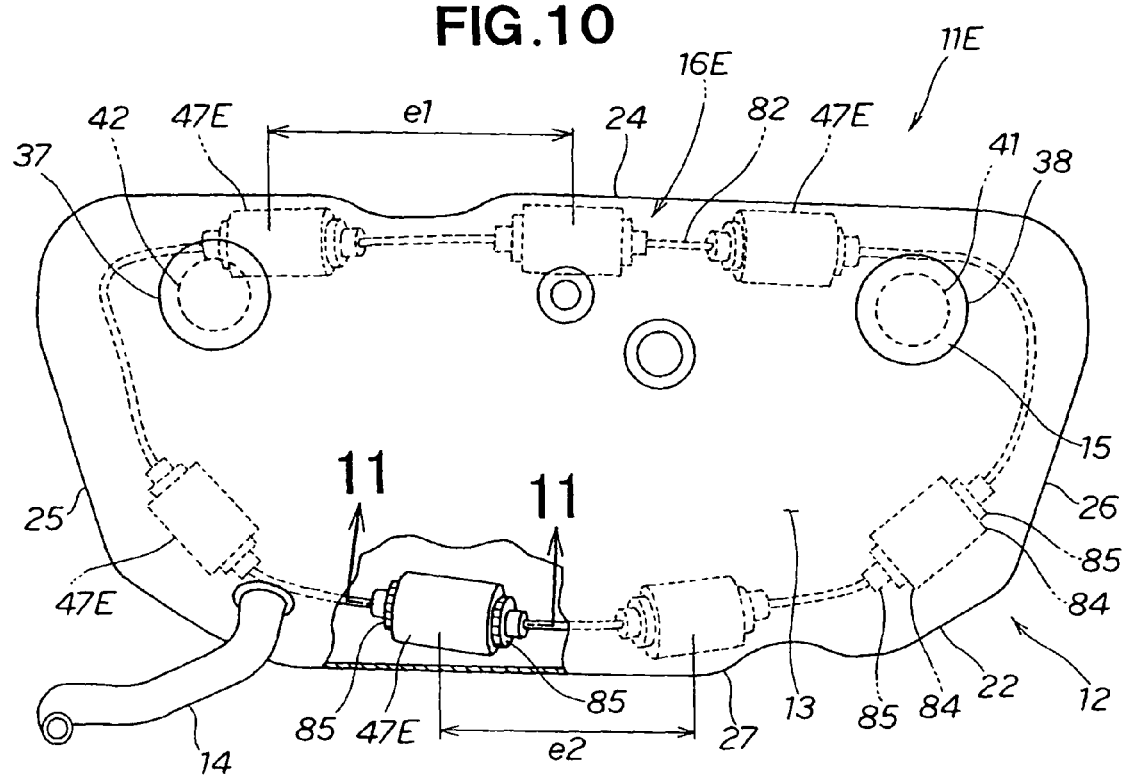
FIG. 10 is a top plan view of a fuel tank according to a fifth embodiment of the present invention.
Figure 11:
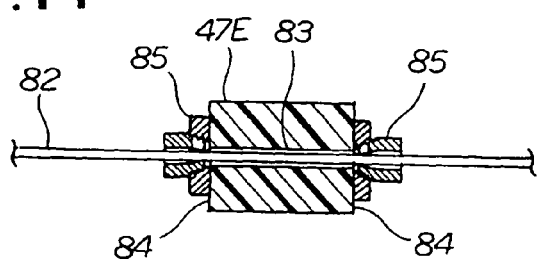
FIG. 11 is a cross-sectional view taken along line 11-11 of FIG. 10.

FIGS. 10 and 11 show a fuel tank 11E according to a fifth embodiment of the present invention.

A plurality of foam members 47E, which are formed using a foamable material, is fixed in place in a row using a metal wire 82, which is a fixation wire, at a predetermined interval e1 or e2, whereby a shock-absorbing member 16E accommodated inside the fuel tank 11E according to the fifth embodiment is arranged in a ring shape and is incorporated into the tank body 12 from the first opening 37 or the second opening 38 for mounting an in-tank functional component 15 (suction pump 41, supply pump 42).

In this arrangement, the shock-absorbing member 16E is a foam member 47E, and may be a single foam member 47E or a plurality of foam members 47E. The member is fixed in place inside the tank body 12 by the fixing wire (metal wire) 82.

In the shock-absorbing member 16E, the foam members 47E are disposed along the front-side part 24 and the rear-side part 27. That is to say, the shock-absorbing members 16E are disposed so as to follow along an internal wall surface of the tank body 12.

The foam members 47E are cylindrically shaped and are provided with a through hole 83 for inserting the metal wire 82 in the axial direction. The two ends 84 of each of the foam members 47E are positioned using two end-fastening members 85, whereby the foam members 47E are fixed to the metal wire 82 so as not to move on the metal wire 82.

The example shows seven foam members 47E lined up in a row, but the number of the foam members 47E can be arbitrarily set according to the width and other conditions of the tank body 12.

The metal wire 82 is formed so as to follow along the lateral plate 22 (front-side part 24, left-side part 25, right-side part 26, rear-side part 27) of the tank body 12.

It is preferable for the length of the metal wire 82 to be set to a length at which the foam members 47E of the shock-absorbing member 16E can press on the lateral plate 22 (front-side part 24, left-side part 25, right-side part 26, rear-side part 27) by the elastic force of the metal wire 82.

Any material can be used for the metal wire 82, examples of which include a piano wire (single wire or a plurality of wires), or a thin wire rope constructed using steel wires. It is also possible to use a wire rod manufactured using resin rather than metal.

The fixing wire (metal wire) 82 is formed into a ring-shape, but may also be placed in the tank body 12 as a straight line or a curved line without the two ends being connected, depending on the shape and other conditions of the tank body 12. For example, it is possible to adopt a structure in which an end of the fixing wire (metal wire) 82 is secured inside the resin tank body 12.

The fixing wire (metal wire) 82 is formed into a ring-shape and is then placed in the tank body 12, but it is also acceptable to place the wire inside the tank body 12 and to then connect both ends to form a ring as the final operation.

Figure 12:
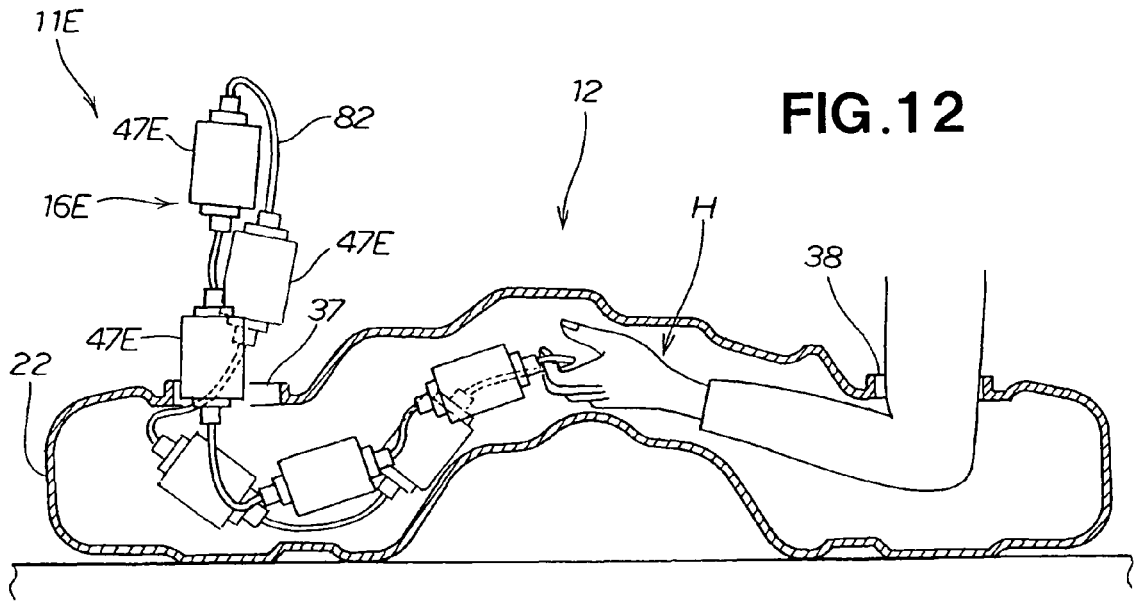
FIG. 12 is a cross-sectional view showing the manner in which the ring-shaped shock-absorbing member of the fifth embodiment is assembled with the tank body.

An outline of an operation in which the ring-shaped shock-absorbing member 16E shown in FIG. 10 is assembled inside the tank body 12 will now be described with reference to FIG. 12. Two openings, a first opening 37 and a second opening 38, are shown in this arrangement, but a single opening is also acceptable.

The shock-absorbing member 16E (metal wire 82) is first formed into a ring shape outside the tank body 12, a hand H is inserted through the second opening 38, the shock-absorbing member 16E is inserted through the first opening 37 and grasped and pulled by the hand H, the shock-absorbing member 16E is brought to an area in the vicinity of the second opening 38, and the ring-shaped shock-absorbing member 16E is completely inserted into the tank body 12.

The shock-absorbing member 16E is made to follow along the lateral plate 22 (front-side part 24, left-side part 25, right-side part 26, rear-side part 27) by the elastic force of the metal wire 82. Assembly of the ring-shaped shock-absorbing member 16E is thereby completed. The suction pump 41 and the supply pump 42 are mounted in subsequent steps.

The fuel tank 11E according to the fifth embodiment has the same operation and effect as the fuel tank 11 according to the first embodiment, such as having no need for forming a through hole in an intermediate barrier layer of the multiple layers constituting the resin tank body 12.

The ring-shaped shock-absorbing member 16E can also be placed in the tank body 12 through a single opening (first opening 37 or second opening 38) in the fuel tank 11E according to the fifth embodiment. A resulting advantage is that the shock-absorbing member 16E can be installed substantially regardless of the shape of the fuel tank as long as there is at least one opening (first opening 37 or second opening 38).

Furthermore, the installation position of the shock-absorbing member 16E may be on the lateral plate 22 (front-side part 24, left-side part 25, right-side part 26, rear-side part 27) of the tank body 12, and the shock-absorbing member can be installed only on the source of the sloshing noise more securely by adjusting the ring shape of the shock-absorbing member 16E and/or the fixing position (interval) of the foam members 47E.

Since the foam members 47E are installed along the front-side part 24 and the rear-side part 27, the shock-absorbing member 16E can better reduce the sound originating in the vicinity of the front-side part 24 and in the vicinity of the rear-side part 27.

Figure 13:
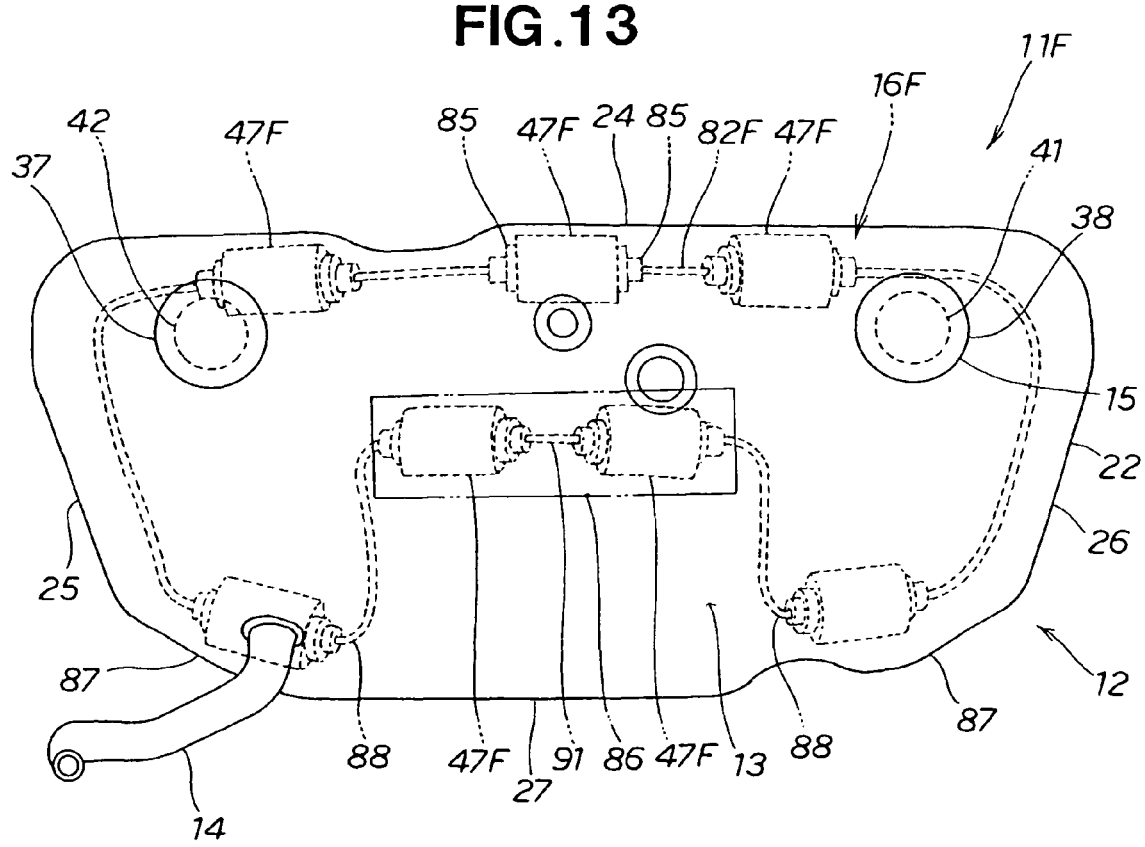
FIG. 13 is a top plan view of a fuel tank according to a sixth embodiment of the present invention.

FIG. 13 shows a fuel tank 11F according to a sixth embodiment of the present invention.

In the shock-absorbing member 16F of the fuel tank 11F according to the sixth embodiment, a plurality of foam members 47F is passed over a metal wire 82F, which is a fixing wire, to form a ring shape; the foam members 47F are placed along the front-side part 24 of the tank body 12; the foam members 47F are placed within a narrow range (shown by a dashed double line) in a center 86 of the tank body 12; and the foam members 47F are placed solely in one portion of the rear-side part 27. That is to say, the foam members 47F are placed in an arbitrary position.

The metal wire 82F is formed alongside the front-side part 24, the left-side part 25, the right side part 26, and the two corners 87 of the rear-side part 27 of the lateral plate 22 of the tank body 12, and is connected to a rear curved portion 88 disposed alongside the two corners 87 to form a central curved portion 91 disposed in a center 86 of the tank body 12.

The material of the metal wire 82F is the same as the material of the metal wire 82 according to the fifth embodiment shown in FIG. 10.

An outline of an operation in which the shock-absorbing member 16F according to the sixth embodiment is assembled inside the tank body 12 is the same as the assembly outline of the shock-absorbing member 16E according to the fifth embodiment described with reference to FIG. 12.

The fuel tank 11F according to the sixth embodiment has the same operation and effect as the fuel tank 11 according to the first embodiment and the fuel tank 11E according to the fifth embodiment.

Furthermore, the shock-absorbing member 16F can be placed in an arbitrary position in the fuel tank 11F according to the sixth embodiment. That is to say, for example, the foam members 47F can be placed at the front-side part 24 or in a narrow range in the center 86 of the tank body 12.

In the embodiments described above, the fuel tank according to the present invention was applied to a fuel tank for a vehicle, but the fuel tank according to the present invention may also be used as a tank for liquids other than that used in vehicles.

Obviously, various minor changes and modifications of the present invention are possible in light of the above teaching. It is therefore to be understood that within the scope of the appended claims the invention may be practiced otherwise than as specifically described.

What is claimed is:

1. A fuel tank comprising:
a resin tank body;
an in-tank functional component provided inside the tank body; and
a shock-absorbing baffle member formed into a shape mountable to the in-tank functional component, said shock-absorbing baffle member comprising a plurality of foam members each having a hollow bore extending through a central portion thereof, wherein the foam members are formed from a foamable fuel-tolerant material and arranged in a sequence on an elongated support member,
wherein the in-tank functional component comprises a resin pipe member having both ends thereof fixed inside the tank body, and wherein the resin pipe member functions as said elongated support member.

2. The fuel tank of claim 1, wherein the in-tank functional component further comprises a supply pump for pumping fuel from inside the tank body.

3. The fuel tank of claim 1, wherein the shock-absorbing baffle member is substantially held in place by the elongated support member and is installed into the tank body from an opening formed in the tank body in order to mount the in-tank functional component, and wherein each of the foam members is held in place on the elongated support member using an end-fastening member at each end thereof.

4. The fuel tank of claim 1, further comprising at least two retaining members provided for holding the foam members in place on the support member, wherein a respective retaining member is provided at each end of the sequence of foam members.

5. The fuel tank of claim 1, wherein each of the foam members has a wall thickness which is greater than a thickness of the support member.

6. A fuel tank assembly comprising:
a resin tank body comprising a first chamber having a first opening formed therein, a second chamber having a second opening formed therein and an arcuate connecting channel interconnecting the first and second chambers;
a fuel supply pump including a supply pump body portion which extends inwardly into the first chamber through the first opening;
a fuel transfer pump for transferring fuel from the second chamber to the first chamber, the fuel transfer pump including a transfer pump body portion which extends inwardly into the second chamber through the second opening;
a resin pipe member which interconnects the fuel supply pump to the fuel transfer pump and provides fluid communication there between; and
a shock-absorbing baffle member disposed inside of the resin tank body, said shock-absorbing baffle member comprising a plurality of foam members each having a hollow bore extending through a central portion thereof, wherein the foam members are formed from a foamable fuel-tolerant material and arranged in a sequence on the resin pipe member.

7. The fuel tank of claim 6, wherein the shock-absorbing baffle member further comprises a respective foam sleeve extending around each of said fuel pumps.

8. A fuel tank assembly comprising:
a resin tank body comprising a first chamber having a first opening formed therein, a second chamber having a second opening formed therein and an arcuate connecting channel interconnecting the first and second chambers;
a fuel supply pump including a supply pump body portion which extends inwardly into the first chamber through the first opening;
a fuel transfer pump for transferring fuel from the second chamber to the first chamber, the fuel transfer pump including a transfer pump body portion which extends inwardly into the second chamber through the second opening;

a resin pipe member which interconnects the fuel supply pump to the fuel transfer pump and provides fluid communication there between, and a shock-absorbing baffle member disposed inside of the resin tank body;

wherein the shock-absorbing baffle member comprises a plurality of foam members placed in a sequence surrounding the resin pipe member.

* * * * *